(12) United States Patent
Dorr

(10) Patent No.: US 6,840,697 B1
(45) Date of Patent: Jan. 11, 2005

(54) BALL-AND-SOCKET JOINT WITH BEARING SHELL

(75) Inventor: Christoph Dorr, Schermbeck (DE)

(73) Assignee: TRW Fahrwerksysteme GmbH & Co. KG, Dusseldorf (DE)

( * ) Notice: Subject to any disclaimer, the term of this patent is extended or adjusted under 35 U.S.C. 154(b) by 0 days.

(21) Appl. No.: 09/640,038

(22) Filed: Aug. 16, 2000

(30) Foreign Application Priority Data

Aug. 16, 1999 (DE) .......................................... 199 38 770

(51) Int. Cl.⁷ .............................................. F16C 11/08
(52) U.S. Cl. ...................... 403/138; 403/133; 403/136; 403/140
(58) Field of Search ................. 403/140, 136, 403/138, 133, 137

(56) References Cited

U.S. PATENT DOCUMENTS

| | | | | |
|---|---|---|---|---|
| 1,520,862 A | * | 12/1924 | Faudi | 403/140 X |
| 2,181,300 A | * | 11/1939 | Flumerfelt | 403/126 |
| 2,993,717 A | * | 7/1961 | Gottschald | 403/133 |
| 3,063,744 A | * | 11/1962 | Flumerfelt | 403/133 |
| 3,350,121 A | * | 10/1967 | Townsend | 403/131 |
| 3,530,495 A | * | 9/1970 | Kindel | 403/140 |
| 3,539,210 A | * | 11/1970 | Wehner | 403/131 |
| 3,574,370 A | * | 4/1971 | Andrew | 403/136 |
| 3,945,737 A | * | 3/1976 | Herbenar | 403/132 |
| 4,318,627 A | * | 3/1982 | Morin | 403/27 |
| 5,066,160 A | * | 11/1991 | Wood | 403/140 |
| 5,154,530 A | * | 10/1992 | Dresselhouse | 403/138 |
| 6,007,079 A | * | 12/1999 | Kincaid et al. | 403/133 X |
| 6,010,272 A | * | 1/2000 | Littman | 403/136 |
| 6,733,200 B2 | * | 5/2004 | Ueno | 403/133 |

FOREIGN PATENT DOCUMENTS

GB            987323 A    *   3/1965

* cited by examiner

*Primary Examiner*—Daniel P. Stodola
*Assistant Examiner*—Ernesto Garcia
(74) *Attorney, Agent, or Firm*—Tarolli, Sundheim, Covell & Tummino L.L.P.

(57) ABSTRACT

Ball-and-socket joint includes a joint housing (1) and a ball head (2) with a ball pivot (3). A bearing shell (4) is disposed between the ball head (2), the joint housing (1), and a housing cover (5). A compressive force is produced between the housing cover (5) and at least a portion of the bearing shell (4). The compressive force acts in an axial direction of the ball pivot (3). The compressive force permanently acts on the portion of the bearing shell (4) and presses the portion of the bearing shell (4) into a gap between the ball head (2) and the joint housing (1).

2 Claims, 4 Drawing Sheets

BALL-AND-SOCKET JOINT WITH BEARING SHELL

Figure 1:
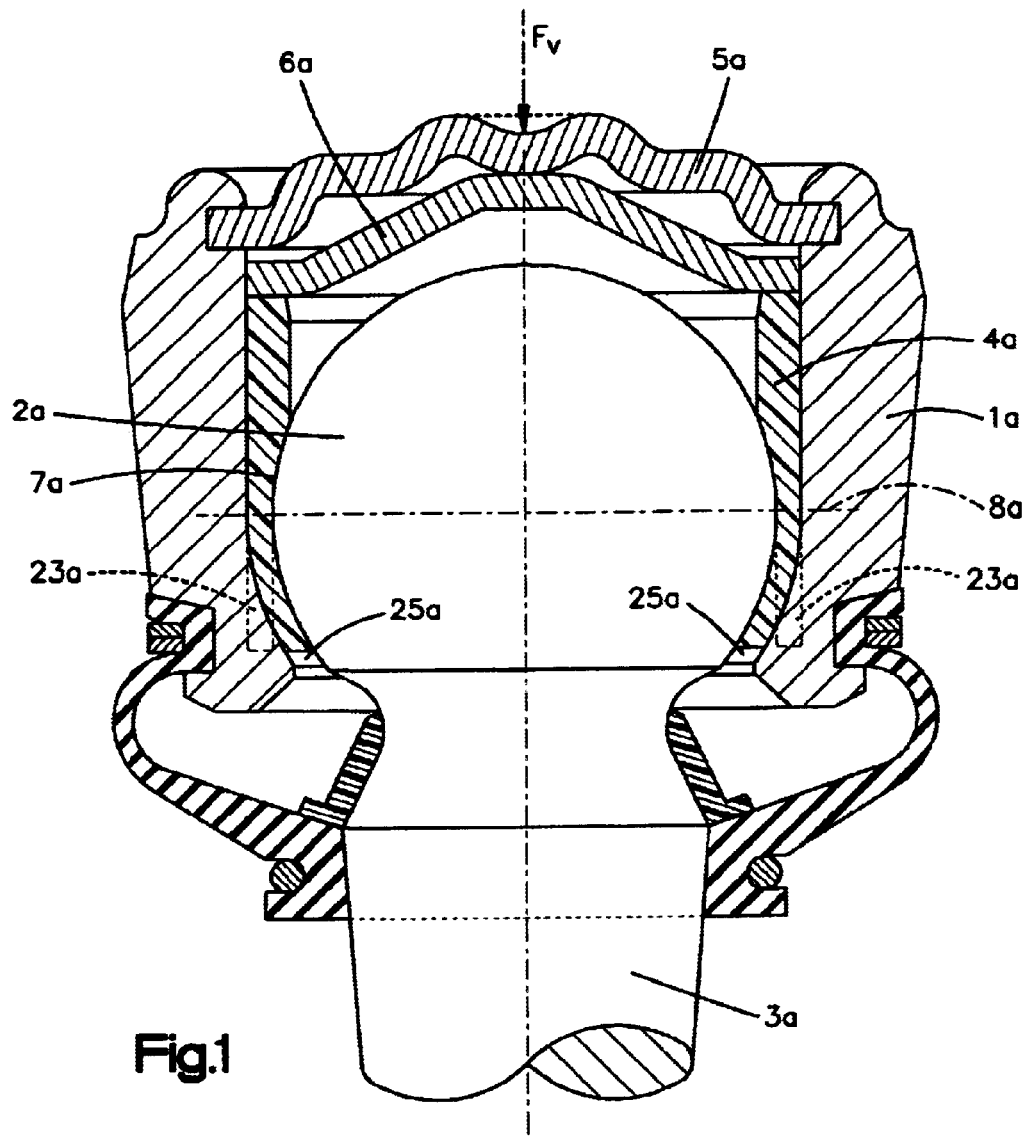

The present invention relates to a ball-and-socket joint comprising a joint housing, a ball head with ball pivot, a bearing shell arranged between ball head and joint housing, and a housing cover.

BACKGROUND OF THE INVENTION

Ball-and-socket joints of said type are known in the art and are preferably used in motor vehicles. The ball head of the ball-and-socket joint is rotatably and tiltably supported in the bearing shell, and the bearing shell in turn is arranged in the joint housing.

The purpose of the bearing shell, which is usually exposed to hard wear, is to compensate the lateral forces acting on the ball-and-socket joint and to absorb shocks to the joint housing and to the ball pivot. The bearing shell is therefore advantageously made of an elastic plastic that can be elastically deformed as a result of the forces acting on the ball-and-socket joint.

To ensure that the ball head is not enclosed too tightly by the bearing shell during assembly of a ball-and-socket joint of the initially mentioned type and that the joint is not too stiff, tight manufacturing tolerances are required particularly in the production of the joint housing. To compensate stiffness of the ball-and-socket joint due to imprecise manufacturing tolerances, a bearing shell has been proposed, which at one end face is provided with very small projections whose height slightly exceeds the manufacturing tolerances of the joint. These projections are deformed when correspondingly high forces are applied as the joint is assembled and have the purpose of compensating the manufacturing tolerances of the joint members such that the tolerance for free movement of the ball-and-socket joints can be kept within limits. However, wear of the bearing shell cannot be compensated by these projections.

With increasing wear of the bearing shell, an undesirable, continuously increasing bearing clearance develops between ball head and bearing shell. With respect to the operating life of the ball-and-socket joint this causes a change in the motive torques of the bearing journal as well as a continuous change in the elasticity properties of the bearing shell. As a consequence, the bearing is no longer exact, which results in imprecise wheel guidance of the ball-and-socket joint and noise development.

Thus, based on this prior art, the object of the present invention is to further develop a ball-and-socket joint of the initially mentioned type to reduce the tolerance of free movement and increase the life of the ball-and-socket joint while simultaneously simplifying the assembly.

SUMMARY OF THE INVENTION

To attain this object, it is proposed according to the invention that a compressive force, which is produced between the housing cover and at least a portion of the bearing shell and axially acts in the direction of the ball pivot, permanently acts on this portion of the bearing shell and presses it into the gap between ball head and joint housing.

This ball-and-socket joint designed according to this technical teaching advantageously allows the compensation of inaccuracies that are due to manufacturing tolerances of the joint members as well to wear. Unlike in prior art processes, the ball-and-socket joint according to the invention is assembled with an intentional axial clearance of the bearing shell in relation to the rolled-in housing cover with respect to both maximum and minimum manufacturing tolerances. The compressive force, which on the cover-side permanently acts in axial direction of the ball pivot on at least a portion of the bearing shell, presses this portion of the bearing shell into the gap between ball head and ball-and-socket joint such that, independent of the different manufacturing tolerances of the individual ball-and-socket joint components, the ball head is supported in the bearing shell under the action of axial forces that are always the same so that different freedoms of movement of the ball joints are avoided. The compressive force can be applied to the bearing shell either directly below the housing cover or it can act on any intersection line or plane as a part of the bearing shell. Due to tolerance compensation, the motive torques of the ball-and-socket joint and the elastic properties of the bearing shell are thus largely independent of the manufacturing process and the resultant manufacturing tolerances of the joint members. Furthermore, the tilting torque of the ball-and-socket joint and the elasticities of the bearing shell can be adjusted in an advantageous manner by correspondingly selecting the compressive force acting on the bearing shell after assembly of the ball-and-socket joint. This makes it possible to produce ball-and-socket joints with low motive torques and elasticities while keeping dimensional tolerances acceptable in terms of process engineering with less variation of the joint properties.

The ball-and-socket joint according to the invention also advantageously compensates wear of the bearing shell. The compressive force permanently acting on the bearing shell causes the bearing shell to advance continuously as wear occurs, such that, in terms of a "self adjustment" of the bearing shell, the ball head is always supported in the bearing shell under the action of identical axial-elastic wedge effects. This ensures largely constant motive torques of the ball-and-socket joint on the one hand and essentially unchanging elastic properties of the bearing shell on the other hand, which advantageously increases the life of the ball-and-socket joint.

To produce the compressive force permanently acting on the bearing shell, the present invention proposes plastically to deform the housing cover in axial direction of the ball pivot with a specifically definable force. A disk made of an elastic material and disposed between housing cover and bearing shell is elastically deformed by the plastic deformation of the housing cover. This generates a preloading force that is applied to the bearing shell as a permanently acting compressive force. Thus, a defined pressing in of the housing cover makes it possible to achieve an exactly definable preloading force of the ball-and-socket joint. According to a particular advantage of the invention, both the housing cover and the disk have an outwardly facing trapezoidal curvature. The inside of the housing cover rests against and fully contacts the disk in the area of the trapezoidal curvature based on a defined applied force and a deformation of the housing cover. This effect can furthermore be enhanced in that the torque of the ball pivot is measured or monitored as the housing cover is pressed in, and the measured data is used to control the pressing-in force.

According to an alternative embodiment, the compressive force permanently acting on the bearing shell is produced by means of a spring that is arranged between the housing cover and the bearing shell and supported against the joint housing via the housing cover. With particular advantage, it is proposed that the spring is a trapezoidal disk spring with an outward curvature. When the joint housing is closed with a rigid housing cover, the disk spring disposed between bearing shell and housing cover is compressed and the resultant spring force permanently acts on the bearing shell in axial direction of the pivot pin in the form of a compressive force. By selecting a corresponding disk spring and its initial stress, the disk spring force and thus also the preloading force of the ball-and-socket joint can be adjusted. According to a further advantageous proposal of the invention, an additional load transmission disk may be disposed between disk spring and bearing shell to optimize introduction of the force into the bearing shell. In a further advantageous embodiment, the contact area between spring and disk is designed as a deformable area. During assembly, after flattening of the spring, this area is deformed to a sufficient degree until the bearing shell has reached its axial end position. The initial preloading of the joint is thus independent of the tolerances of the individual components and the size of the spring force.

According to an alternative embodiment, the bearing shell arranged between ball head and joint housing has a two-part design and is divided into an upper shell and a lower shell. This partitioning of the bearing shell into two parts advantageously creates two mutually independent functional areas that may be designed according to the requirements they are intended to meet. For example, the upper shell serves to compensate the inaccuracies due to the manufacturing tolerances of the joint members, whereas the lower shell compensates wear.

To compensate the inaccuracies due to the manufacturing tolerances in the assembly of the ball joint, the invention proposes that the upper shell, on the housing cover side, be provided with a collar, which in the assembled state of the ball-and-socket joint is wedged between the housing cover and a housing shoulder. To assemble the ball-and-socket joint, a compressive force acting in axial direction of the ball pivot is generated on the cover side and applied via the housing cover to press the bearing shells into the gap between ball head and housing. The compressive force acting during assembly is transmitted from the upper shell to the lower shell. The inaccuracies due to the manufacturing tolerances of the joint members can be compensated due to a plastic deformation of the collar arranged between the actual upper shell and the housing cover. The axial end position of the upper and lower shell is established as a function of the tolerances of the individual components, such that, irrespective of manufacturing tolerances, the ball head is supported in the bearing shell and different freedoms of movement of the ball-and-socket joints are avoided.

According to a further feature of the invention, to compensate wear of the bearing shell, a spring element is disposed in axial direction between upper shell and lower shell. In the assembled state, this spring element is supported against the housing cover via the upper shell and produces a compressive force permanently acting on the lower shell, which causes a continuous advancement of the lower shell as wear occurs. This allows a "self-adjustment" of the lower shell of the ball head under the action of axial-elastic wedge effects that remain always the same and achieves, on the one hand, motive torques that are largely constant and on the other hand essentially unchanged elastic properties of the bearing shell. This advantageously prolongs the life of the ball-and-socket joint. According to a further feature of the invention, the spring element disposed between upper shell and lower shell is a spring washer of a wave-shaped design that is pushed up completely after assembly and thus can transmit the full magnitude of the assembly compressive force to the lower shell.

Insertion of the bearing shell into the joint housing can-be carried out in separate consecutive steps, or the individual components, lower shell, spring element and upper shell, can be combined into a packet and inserted into the joint housing as a unit in a single assembly step. To form the assembly packet, the upper and lower shell can be fabricated in a common injection mold with a corresponding recess being provided to receive the spring element that separates the lower shell from the upper shell. Irrespective of whether the bearing shell is assembled in a single step or in multiple steps, it has proven to be advantageous to give the lower shell a cylindrical contour prior to its assembly and in contrast to its embodiment after completed assembly.

BRIEF DESCRIPTION OF THE INVENTION

Figure 2:
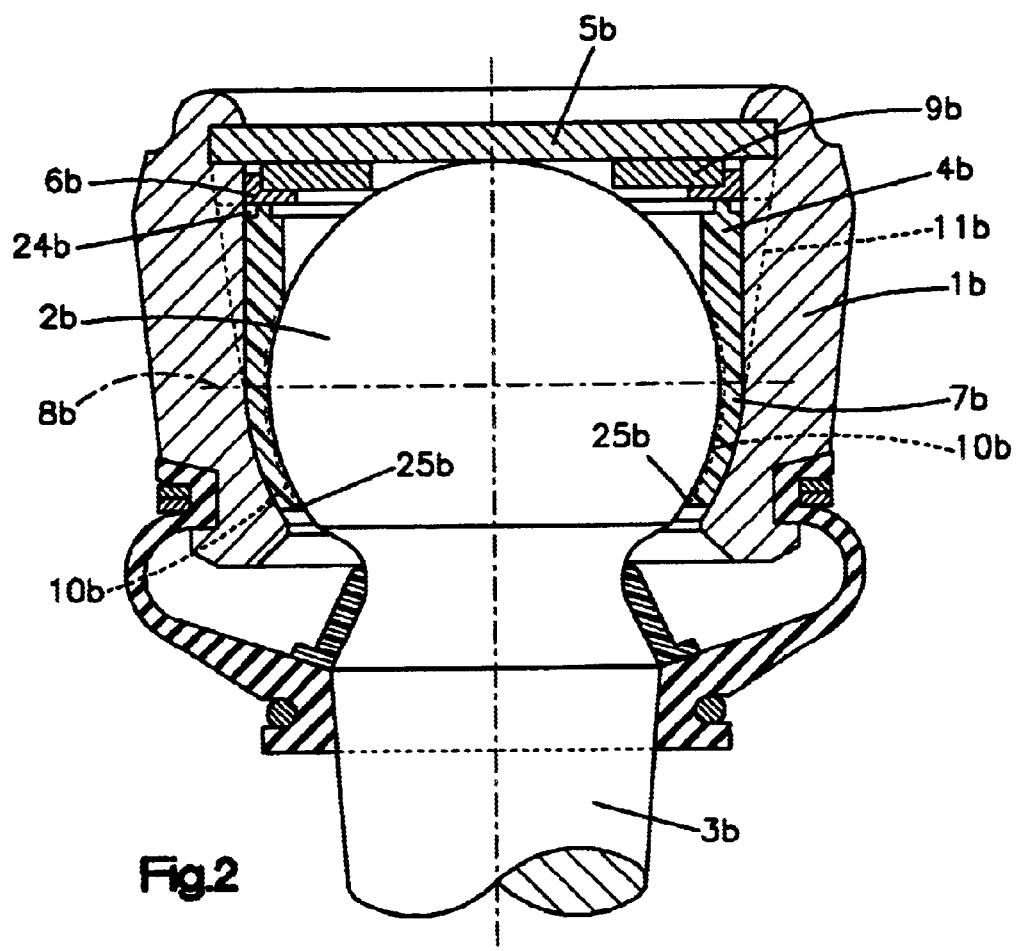
Figure 5:
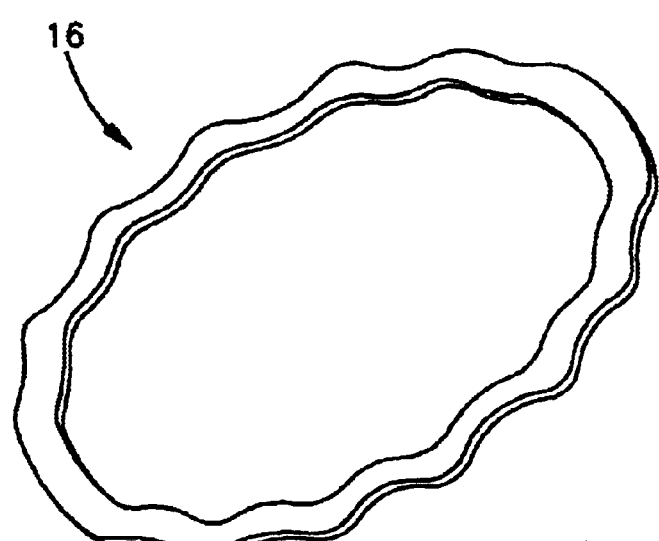
Figure 3:
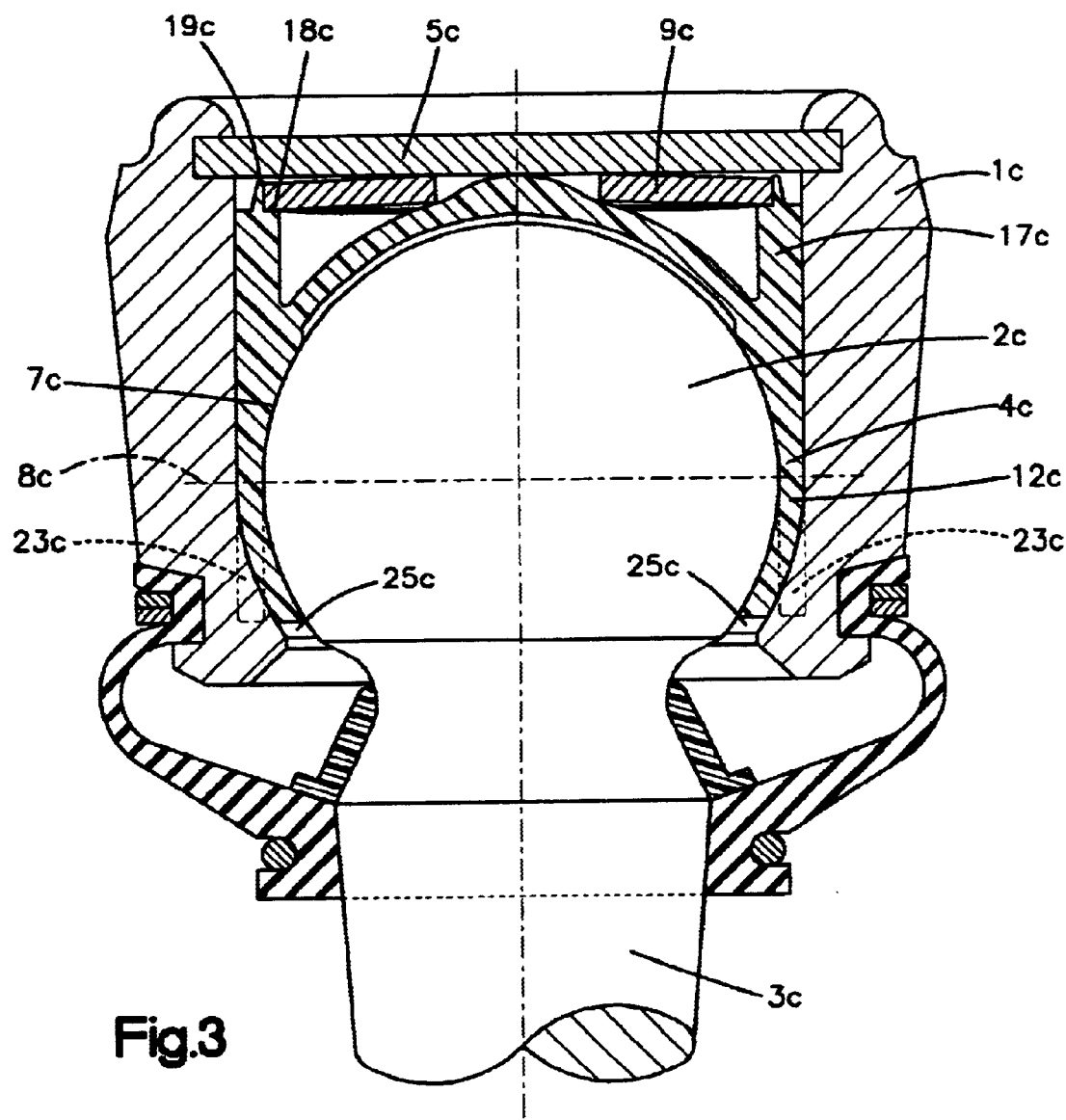
Figure 4B:
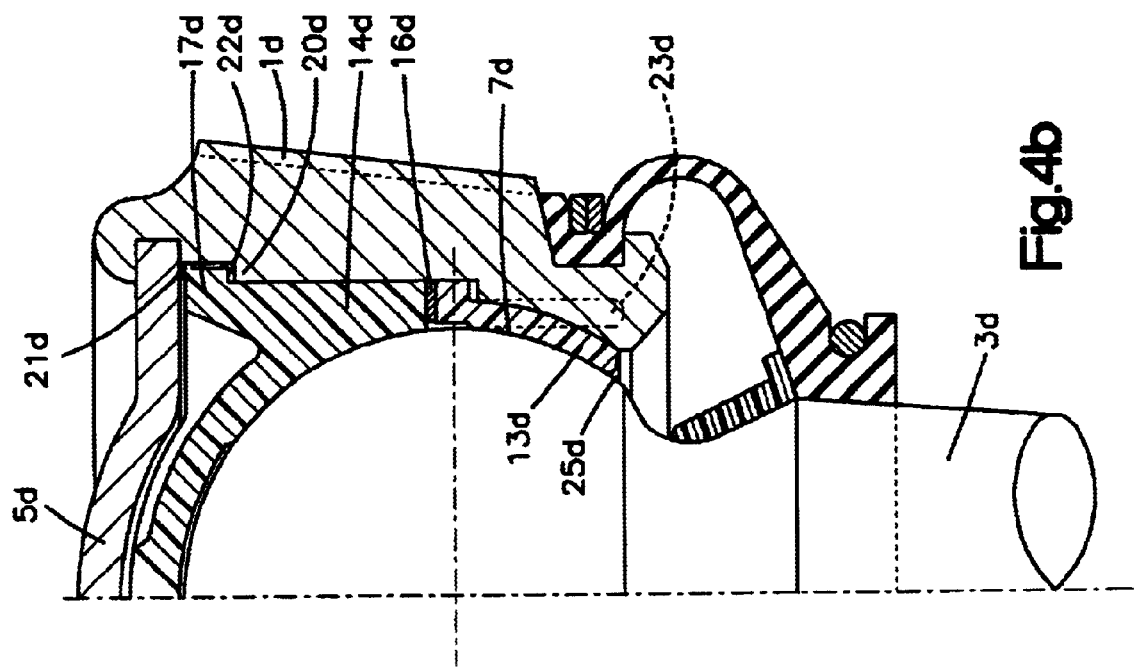
Figure 4A:
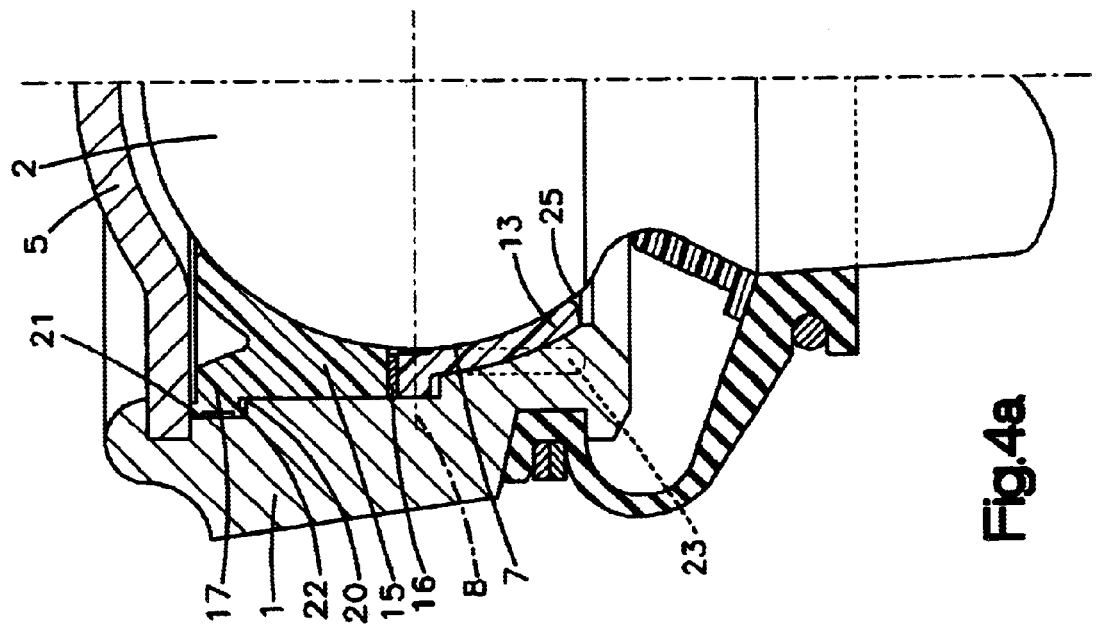

Further details and advantages of the invention will become clear from the following description by means of the drawings in which FIG. 1 is a sectional view of a ball-and-socket joint with an integrally formed housing cover, FIG. 2 is a sectional view of a ball-and-socket joint with a disk spring disposed between bearing shell and housing cover according to a first embodiment, FIG. 3 is a sectional view of a ball-and-socket joint with a disk spring disposed between bearing shell and housing cover according to a second embodiment, FIG. 4a is a sectional view of a ball-and-socket joint with a two-part bearing shell and a spring washer, FIG. 4b is a sectional view of a further ball-and-socket joint with a two-part bearing shell and a spring washer, and FIG. 5 is a three-dimensional view of the spring washer for use in the ball-and-socket joint of FIGS. 4a.

DETAILED DESCRIPTION OF THE INVENTION

The ball-and-socket joint depicted in FIG. 1 essentially comprises a ball head 2a with integrally formed ball pivot 3a and a joint housing 1a sealed with a housing cover 5a. The ball head 2a is supported in a bearing shell 4a, which in turn is arranged in joint housing 1a. The bearing shell 4a is designed as one piece, contacts the ball head 2a with its sliding surface 7a on both sides of the equatorial plane 8a and supports it.

As the ball-and-socket joint is assembled, a precisely defined force $F_v$ is applied to the housing cover 5a provided with an outwardly facing trapezoidal curvature, which causes a plastic deformation of the housing cover 5a in the area of the trapezoidal curvature. In this figure, force $F_v$ is indicated by a dashed line. Based on this plastic deformation of the housing cover 5a, the disk 6a disposed between bearing shell 4a and housing cover 5a is elastically deformed and applies a permanent compressive force to the bearing shell 4a in axial direction of the ball pivot 3a. This causes bearing shell 4a to be pressed into the gap 25a between joint housing 1a and ball head 2a. This has the advantage that the ball-and-socket joint is not susceptible to manufacturing tolerances of the joint members, particularly of joint housing 1a and ball head 2a, and that the preloading force of the ball-and-socket joint can be adjusted by means of the precisely defined pressing-in force $F_v$. The motive torques of the ball-and-socket joint, which are determined by the preloading force as well as the elastic properties of the bearing shell 4a can thus also be specifically adjusted via the pressing-in force $F_v$ irrespective of the manufacturing tolerances. This makes it possible to produce a ball-and-socket joint with low motive torques and elasticities, which despite acceptable dimensional tolerances in terms of process engineering has a narrow variation range with respect to the motive torques and the elasticities. As wear occurs in the bearing shell 4a, the compressive force permanently acting on the bearing shell causes the bearing shell 4a to advance into the gap 25a between ball head 2a and joint housing 1a. This "self-adjustment" of the bearing shell 4a ensures nearly identical motive torques and elasticity properties despite wear. Prior to assembly, the bearing shell preferably has a cylindrical contour 23a on the pivot side, which only after assembly is plastically deformed into its final ball-shaped contour.

In the embodiment of the ball-and-socket joint according to the invention shown in FIG. 2, the compressive force permanently acting on the bearing shell 4b in axial direction of the ball pivot 3b is produced by means of a disk spring 9b disposed between bearing shell 4b and housing cover 5b. For better force application to the bearing shell 4b, a load transmission disk 6b is arranged between disk spring 9b and bearing shell 4b. The desired preloading force of the ball-and-socket joint can be adjusted through a corresponding selection of the disk spring properties. As described above, the compressive force generated by the disk spring 9b and transmitted to the bearing shell 4b also serves to press the bearing shell 4b into the gap 25b between the ball head 2b and joint housing 1b. Consequently, the ball-and-socket joint is not susceptible to manufacturing tolerances on the one hand, and the wear contour 10b is compensated by an axial advance of the bearing shell on the other hand. The embodiment of the joint housing 1b shown in FIG. 2 has a substantially cylindrical inner contour starting from the equatorial plane 8b of the ball head 2b toward the cover-side end. This inner contour, according to a special embodiment of joint housing 1b, can be conical with a tapering diameter in the direction of the equatorial plane 8b of the ball head 2b. This is indicated by the dashed line 11b. If a joint housing 1b with conical inner contour is used, the bearing shell 4b is correspondingly adapted. The conical embodiment of the inner contour advantageously reduces the torque of the ball-and-socket joint caused by the permanently acting compressive force of the spring 9b. According to a further embodiment of the ball-and-socket joint, an elastic ring made of rubber is disposed between bearing shell 4b and housing cover 5b instead of the disk spring 9b.

In a further preferred embodiment, the contact area between spring 9b or disk 6b is made as a deformable area 24b. During assembly, this area, after flattening of the spring, is deformed to a sufficient degree until the bearing shell 4b has reached its axial end position. The initial preloading of the joint is thus independent of the tolerances of the individual components and the size of the spring force.

FIG. 3, according to a second embodiment, also shows a ball-and-socket joint with a spring disk 9c disposed between bearing shell 4c and housing cover 5c. In contrast to the embodiment depicted in FIG. 2, a circumferential collar 17c is provided instead of a load transmission disk disposed between disk spring 9c and bearing shell 4c. In the assembled state of the ball-and-socket joint this collar 17c rests against the disk spring 9c and transmits the compressive force generated by the disk spring 9c to the bearing shell. The circumferential collar 17c and the bearing shell 4c are designed as one piece, but in contrast to the embodiment shown in FIG. 2, the bearing shell is formed as a closed bearing shell 12c. The collar 17c is provided with a shoulder 18c and with snap locking means 19c for a secure seat of the disk spring 9c. As explained above in connection with the embodiment according to FIG. 2, the desired preloading force of the ball-and-socket joint can be adjusted via a corresponding selection of the disk spring properties in this embodiment as well.

FIG. 4a shows a left part of a ball-and-socket joint according to the invention whereas FIG. 4b shows a right part of a further ball-and-socket joint according to the invention. The embodiments of FIGS. 4a and 4b both have a two-part design of the bearing shell comprising an upper and a lower shell. The upper and lower shells are labeled 15 and 13, respectively, in FIG. 4a and are labeled 14d and 13d, respectively, in FIG. 4b. The embodiment depicted in FIG. 4a shows an upper shell 15 with an open design and the embodiment depicted in FIG. 4b shows an upper shell 14d with a closed design. The upper shell 15, 14d has an integrally formed circumferential collar 17, 17d on the cover side, which in the assembled state of the ball-and-socket joint is wedged between the housing cover 5, 5d and the housing shoulder 20, 20d. This circumferential collar 17, 17d has deformable areas 21 and 22, 21d and 22d that have a tolerance compensating effect on the axial position of the upper and lower shell 15, 14d and 13, 13d when the joint is assembled. To compensate wear of the bearing shell, a spring element in the form of a wave-shaped washer 16, 16d is provided between the upper shell 15, 14d, and the lower shell 13, 13d. This spring washer 16, 16d is supported against the housing cover 5, 5d via the upper shell 15, 14d and applies a compressive force permanently acting on the lower shell 13, 13d, which causes the lower shell 13, 13d continuously to advance as wear occurs. This "self adjustment" of the lower shell 13, 13d makes it possible that the ball head 2, 2d is supported in the bearing shell under the action of axial-elastic wedge effects that remain always the same. During assembly, this spring washer is flattened and the full magnitude of the assembly compressive force is thereby transmitted from the upper to the lower shell.

In contrast to the embodiments depicted in FIGS. 1 to 3, the two-part embodiment of bearing shell has the effect of a functional division. The upper shell 15, 14d with its integrally formed rim 17, 17d serves to compensate inaccuracies due to manufacturing tolerances, whereas the lower shell 13, 13d compensates wear. With this function-related division between upper and lower shell 15, 14d and 13, 13d, and the arrangement of a spring washer 16, 16d between upper and lower shell 15, 14d and 13, 13d, the spring force required for the advancement of the shell is advantageously reduced substantially so that low motive torques can be realized.

FIG. 5 is a three-dimensional representation of the wave-shaped spring washer 16 between upper and lower shell 15, 13 in FIG. 4a in its non-stressed state. The spring washer 16d of FIG. 4b is similar to the wave spring 16 of FIG. 4a. Under the action of the pressing-in force that is applied to the bearing shell during assembly, ring 16 is compressed and thereafter tries to expand in axial direction to assume the non-stressed state depicted in FIG. 5. Due to this expansion tendency of the spring washer 16, the lower shell 13 in FIG. 4a is pressed into the gap 25 between ball head 2 and joint housing 1, which makes it possible to compensate wear of bearing shell. Similarly, the lower shell 13d in FIG. 4b is pressed into the gap 25d between ball head 2d and joint housing 1d, which makes it possible to compensate wear of bearing shell.

What is claimed is:
1. A ball-and-socket joint comprising:
 a joint housing having first and second axial ends;
 a ball head with a ball stud extending from the ball head, the ball head being received in the joint housing and the ball stud extending outward of the first axial end of the joint housing, a gap being formed between the ball head and the joint housing adjacent the ball stud at the first axial end of the joint housing;

a bearing shell received in the joint housing for supporting the ball head for tilting relative to the joint housing;

a housing cover for closing the second axial end of the joint housing; and means interposed between the housing cover and at least a portion of the bearing shell for acting upon the portion of the bearing shell to urge the portion of the bearing shell toward the first axial end of the joint housing and, in response to wear of the portion of the bearing shell, to wedge the portion of the bearing shell into the gap, the bearing shell including separate and distinct first and second parts, the first part being an upper shell and the second part being a lower shell, the upper shell, which is located further from the first axial end of the joint housing than the lower shell, including a collar that is wedged between the housing cover and a shoulder of the joint housing and prevents movement of the upper shell relative to the joint housing.

2. The ball-and-socket joint as claimed in claim 1 wherein the collar includes deformable areas, the deformable areas of the collar enabling a combination of the upper shell, the spring element, and the lower shell to be adapted for use with joint housings of varying tolerances.

* * * * *